US007631661B2

(12) United States Patent
Moreno

(10) Patent No.: US 7,631,661 B2
(45) Date of Patent: Dec. 15, 2009

(54) STRAIGHT FLOW REVERSING VALVE

(75) Inventor: Jack A. Moreno, Delaware, OH (US)

(73) Assignee: Zhejiang Sanhua Co Ltd., Zhejiang (CN)

( * ) Notice: Subject to any disclaimer, the term of this patent is extended or adjusted under 35 U.S.C. 154(b) by 934 days.

(21) Appl. No.: 10/924,344

(22) Filed: Aug. 23, 2004

(65) Prior Publication Data
US 2006/0037654 A1    Feb. 23, 2006

(51) Int. Cl.
F16K 11/074    (2006.01)
(52) U.S. Cl. .................... 137/625.43; 251/65
(58) Field of Classification Search ............ 137/625.43, 137/625.11, 625.46, 625.47; 62/324.6; 251/287, 251/65; 310/156.01, 156.55
See application file for complete search history.

(56) References Cited

U.S. PATENT DOCUMENTS

| 2,229,931 | A | * | 1/1941 | Parker .................... 137/625.22 |
| 2,229,932 | A | * | 1/1941 | Parker ......................... 251/175 |
| 2,660,195 | A | * | 11/1953 | Risley et al. .............. 137/15.01 |
| 2,672,887 | A | * | 3/1954 | Tipton ...................... 251/30.02 |
| 2,693,930 | A | * | 11/1954 | Carter .......................... 251/44 |
| 3,194,267 | A | * | 7/1965 | Lyon et al. ............. 137/625.11 |
| 4,311,020 | A | * | 1/1982 | Tobin et al. ................. 62/324.6 |
| 4,318,425 | A |   | 3/1982 | Marks |
| 4,381,798 | A | * | 5/1983 | Tobin et al. ............. 137/625.43 |
| 4,445,540 | A | * | 5/1984 | Baron et al. ............ 137/625.43 |
| 4,573,497 | A |   | 3/1986 | White |
| 4,712,582 | A |   | 12/1987 | Marks |
| 4,825,908 | A | * | 5/1989 | Tsuchihashi et al. ... 137/625.43 |
| 5,172,725 | A | * | 12/1992 | Kitagawa ................ 137/625.43 |
| 5,507,315 | A |   | 4/1996 | Parker |
| 5,547,344 | A | * | 8/1996 | Sugiyama et al. ............. 417/32 |
| 5,878,781 | A | * | 3/1999 | Parker .................... 137/625.43 |
| 5,885,062 | A | * | 3/1999 | Inoue et al. .................. 417/280 |
| 5,911,242 | A | * | 6/1999 | Parker .................... 137/625.43 |
| 5,937,902 | A | * | 8/1999 | Ohno et al. ............ 137/625.43 |
| 5,992,459 | A |   | 11/1999 | Sugita et al. |
| 6,058,974 | A | * | 5/2000 | Blomgren ............... 137/625.43 |
| 6,070,613 | A | * | 6/2000 | Sugita et al. ........... 137/625.43 |
| 6,076,553 | A |   | 6/2000 | Sugita et al. |
| 6,158,466 | A |   | 12/2000 | Riefler |
| 6,289,931 | B1 | * | 9/2001 | Sisk et al. ............... 137/625.43 |
| 6,295,828 | B1 | * | 10/2001 | Koo ........................... 62/324.6 |

* cited by examiner

Primary Examiner—Robin O Evans
Assistant Examiner—Craig Price
(74) Attorney, Agent, or Firm—Renhart Boerner Van Deuren P.C.

(57) ABSTRACT

Provided is a reversing valve that can reverse flow in a refrigeration system. The reversing valve includes a valve body extending between a first end and an opposing second end. Multiple ports are disposed through the first and second ends. In one aspect, to reduce the pressure drop across the valve body, flow is channeled generally straightly between the ends. This is accomplished by a valve member defining a channel that is coupled to a port at the first end while pivotally movable to intersect different ports at the second end. Flow direction in the system is determined by which port at the second end is intersected. In another aspect, to move the valve member, the reversing valve includes a permanent magnet joined to the valve member and an electromagnet extending partly around the valve body. Applying different polarities to the electromagnet moves the permanent magnet and the valve member.

11 Claims, 8 Drawing Sheets

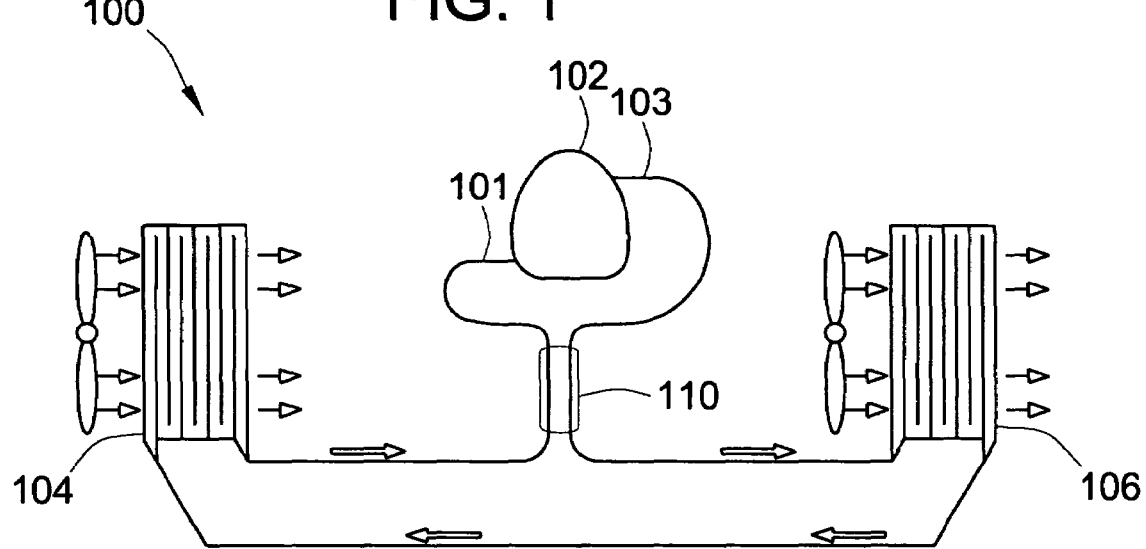
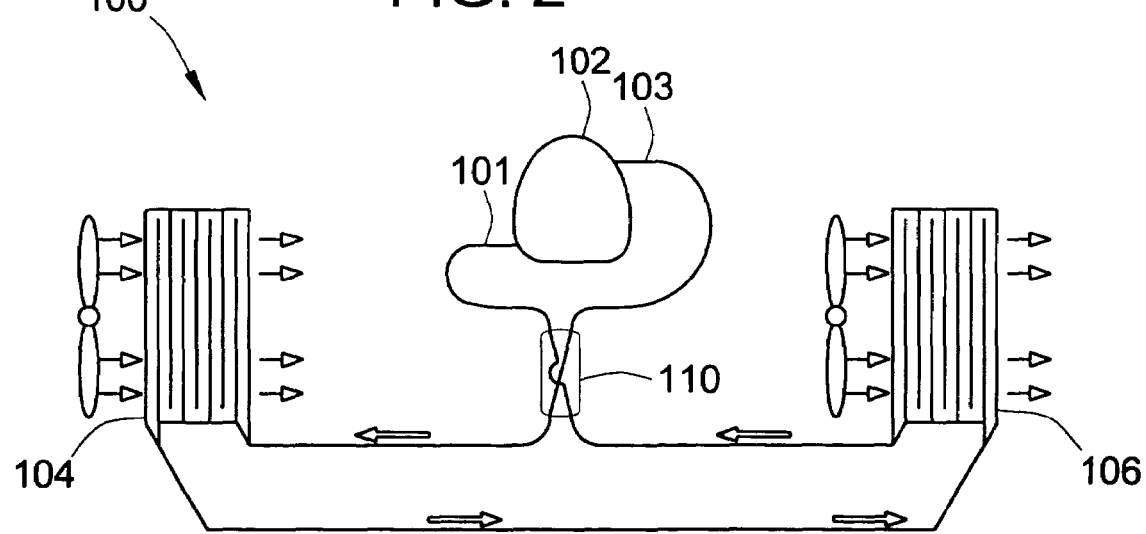

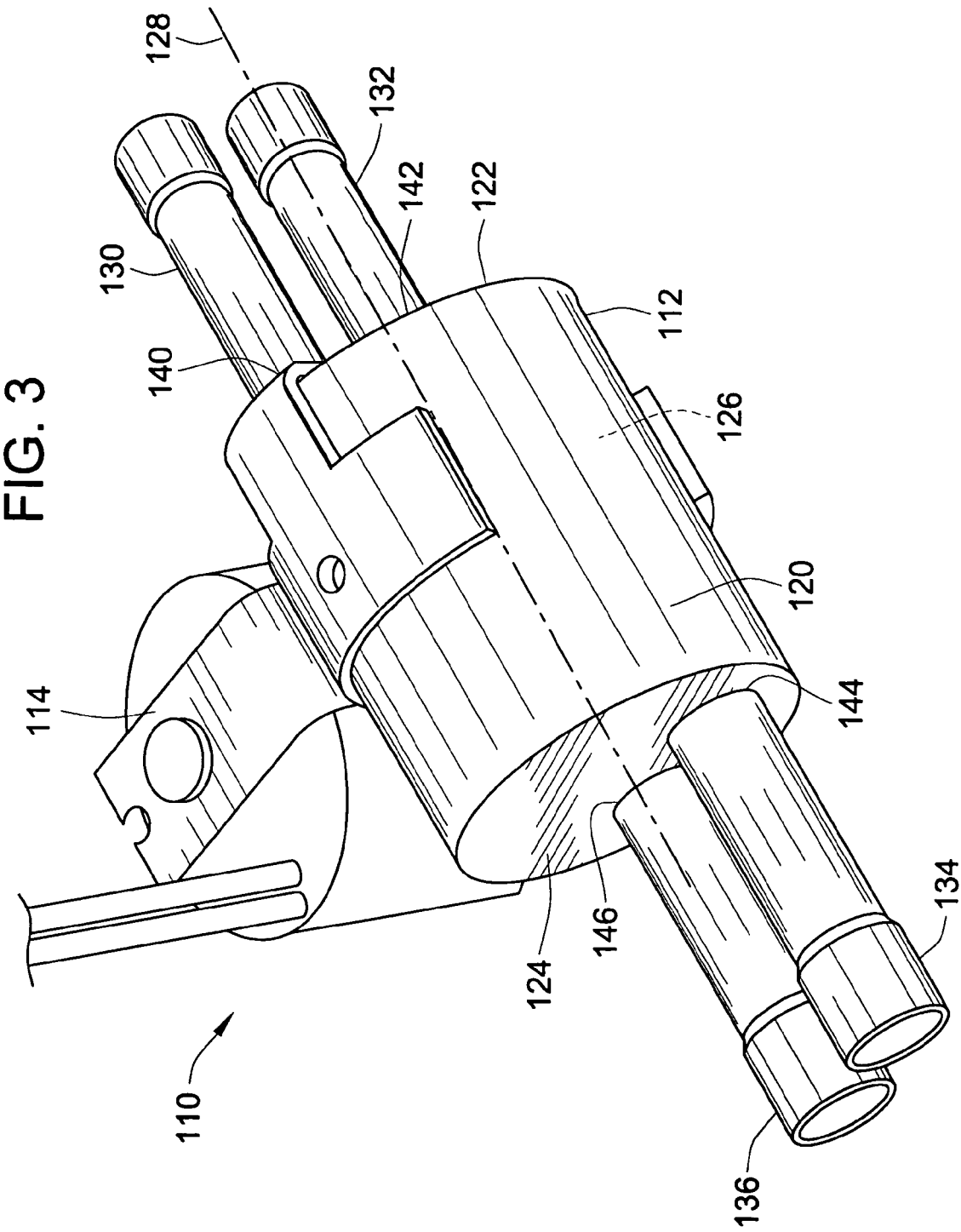

STRAIGHT FLOW REVERSING VALVE

FIELD OF THE INVENTION

This invention relates generally to flow control valves and more particularly to flow reversing valves for reversing flow in, for example, a refrigeration system.

BACKGROUND OF THE INVENTION

Reversing valves are typically used in various systems in which a fluid is directed to flow in various alternative loops or circuits. For instance, heat pumps are specialized refrigeration systems that can be selectively configured to operate in either of two different modes. In the first, or cooling mode, energy in the form of heat is removed from an "inside" environment and transferred to an "outside" environment. Accordingly, in the second, or heating mode, heat energy is transferred into the inside environment. To carry the heat energy, the heat pump system uses a compressor to circulate fluid refrigerant through a closed system that includes heat transfer coils located in each environment. In addition to circulating the refrigerant, the compressor is used to impart heat into the system.

To switch the heat pump system between heating and cooling modes, the system uses a reversing valve assembly that can be selectively manipulated to alter the flow of refrigerant. The reversing valve assembly typically includes a valve body having at least four ports through which the reversing valve assembly is interconnected with the rest of the heat pump system. The first port is always in communication with the high pressure discharge of the compressor while the second port is always in communication with the low pressure inlet of the compressor. The remaining two ports, or system ports, are in communication with the heat transfer coils. By using the reversing valve assembly to change the direction of refrigerant flow between the heat transfer coils, the heat pump system is switched between heating and cooling modes.

To change the direction of refrigerant flow, the reversing valve assembly also includes a movable valve member that can be selectively placed between one of two alternative positions. In the first position, the valve member channels refrigerant directly between the second, compressor inlet port and one of the system ports while in the second position, the valve member channels refrigerant directly between a compressor inlet port and the other system port. Often, in prior art reversing valves, the valve member is moved in response to a change in an actuating pressure that is supplied from a pilot valve assembly. The pilot valve assembly is an electrically-operated device that is in fluid communication with both the valve body and the heat pump system. The pilot valve assembly draws refrigerant pressure from the system and converts that pressure to the actuating pressure which is then directed onto the valve body to urge the valve member between positions. Drawbacks associated with the use of pilot valve assemblies to supply an actuating pressure include the additional parts and complex fluid piping and sealing arrangements that are required.

In addition to channeling the refrigerant between the compressor inlet port and either of the system ports, the valve member also functions to prevent the high pressure refrigerant from the compressor discharge port from directly entering the compressor inlet port. Because the valve member is subject to the large pressure differential existing between the compressor discharge port and the compressor inlet port, prior art valve members are often provided with additional support structures. These support structures are typically located proximate to where the valve member encounters the second, compressor inlet port and may obstruct refrigerant flow resulting in an increase in the pressure drop across the reversing valve. Since the compressor must make up for the pressure drop, the overall efficiency of the heat pump system suffers.

By design, in prior art reversing valves assemblies, the compressor inlet port and two system ports are typically arranged adjacent to each other. Accordingly, to redirect refrigerant flow between any selected pairing of the compressor inlet port and the two system ports, the valve member must channel refrigerant through a relatively sharp bend. It is known that redirecting fluid flow through a sharp bend develops turbulent secondary currents that result in shock and friction losses. The shock and friction losses add to the pressure drop across the reversing valve which must be compensated for by the compressor, therefore reducing the efficiency of the heat pump system.

BRIEF SUMMARY OF THE INVENTION

The invention provides a reversing valve assembly designed to reduce the pressure drop across the valve member. The reversing valve assembly includes a valve body in which the various ports are arranged so that fluid communication between any pairing of the compressor inlet and system ports occurs across a relatively straight channel. By directing the refrigerant flow across a generally straight channel, as opposed to redirecting the flow through a sharp bend, the friction losses and shock caused by the reversing valve are reduced. Accordingly, the pressure drop across the reversing valve is also reduced.

To provide the relatively straight channel, the reversing valve includes an elongated valve member that extends between a first end and an opposing second end of the valve body. The compressor inlet and discharge ports are disposed through the first end while the system ports are disposed through the second end. The valve member, in which the channel is defined, is permanently coupled to the compressor inlet port but is pivotally movable with respect to the two system ports. Accordingly, when the valve member is moved to a first position, the channel intersects the compressor inlet and one of the system ports while simultaneously allowing communication between the compressor discharge and other system port via the valve body. Likewise, when the valve member is moved to a second position, the channel intersects the compressor inlet port and the second system port while simultaneously allowing communication between the compressor discharge port and the other system port via the valve body. In either position, refrigerant flow occurs in a generally straight direction between the two opposing ends.

In another aspect, the invention provides a magnetic actuator that utilizes a magnetic flux for moving the valve member between the first and second positions. The magnetic actuator includes a permanent magnet that is joined to the movable valve member inside the valve body and a selectively activated electromagnet that can be attached to the valve body. The permanent magnet includes a north pole and a south pole that, depending upon the polarity applied to the electromagnet, are attracted to and repulsed from different portions of the electromagnet. By manipulating the polarity of the electromagnet, the permanent magnet and the attached valve member can be made to move within the valve body.

An advantage of the invention is that it provides a reversing valve assembly in which refrigerant flow is channeled straight between the compressor inlet port and a selected system port. Another advantage is that straight flow of refrigerant reduces the pressure drop across the reversing valve assembly resulting in a better system efficiency. Another advantage is that the invention provides a magnetic actuator that uses permeating magnetic flux to move the valve member, thereby allowing the valve body to remain hermetically sealed. These and other advantages and features of the invention will be apparent from the detailed description and the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1 is a schematic illustration of a reversible refrigeration system utilizing a reversing valve assembly as operating in "cooling" mode.

FIG. 2 is a schematic illustration of the reversible refrigeration system of FIG. 1 as operating in "heating" mode.

FIG. 3 is a top perspective view of the exterior of a reversing valve assembly including an actuator and a valve body with flow tubes for connecting to a refrigeration system.

Figure 4A:
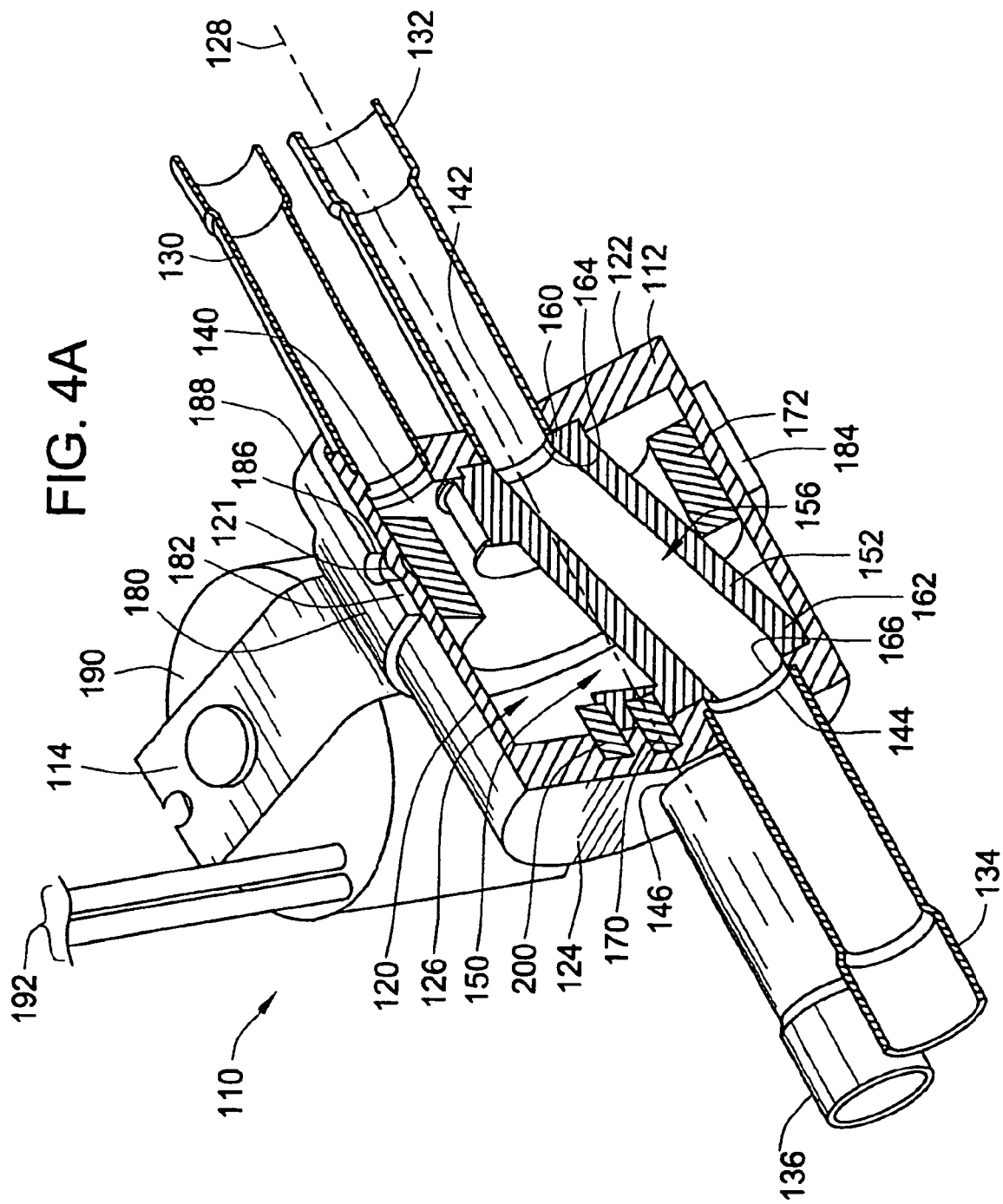
FIG. 4A is a cutaway view, taken along lines 4A-4A in FIG. 7, of the reversing valve assembly illustrating a movable, generally straight valve member for selectively redirecting refrigerant between selected ports.

While the invention will be described in connection with certain preferred embodiments, there is no intent to limit it to those embodiments. On the contrary, the intent is to cover all alternatives, modifications and equivalents as included within the spirit and scope of the invention as defined by the appended claims. Where appropriate, like reference numerals are used in alternate embodiments of the invention to identify substantially similar components, elements and features.

DETAILED DESCRIPTION OF THE INVENTION

Now referring to the drawings, wherein like reference numbers refer to like elements, there is illustrated in FIGS. 1 and 2 a typical "heat-pump" style refrigeration system 100 in which a reversing valve assembly designed in accordance with the invention can be used. As described above, the heat pump refrigeration system 100 is capable of selectively operating in either a heating or a cooling mode. The refrigeration system 100 includes a compressor 102, an "inside" coil 104, and an "outside" coil 106, all of which are interconnected by tubing or piping for communicating liquid or vapor refrigerant. The terms "inside" and "outside" refer only to environments between which heat energy is to be exchanged and are not intended to necessarily refer to indoor and outdoor environments. To control the flow of heat within the system 100, the reversing valve assembly 110 is interconnected between the compressor 102 and the inside and outside coils 104, 106.

In the cooling mode, illustrated in FIG. 1, heat energy is removed from the environment surrounding the inside coil 104 and transferred to the environment surrounding the outside coil 106. To accomplish this, in the first stage of the cycle, high temperature, pressurized refrigerant vapor from the discharge end 103 of the compressor 102 is first communicated by the reversing valve assembly 110 to the outdoor coil 106. At the outdoor coil, the pressurized refrigerant vapor condenses into liquid refrigerant through an exothermic reaction through which heat energy is removed from the refrigerant and transferred to the outside environment. The pressurized liquid refrigerant is next directed to the inside coil 104. At the inside coil 104, in the second stage of the cooling cycle, the liquid refrigerant expands through an expansion device into a low pressure vapor phase through an endothermic reaction. During this reaction, heat energy from the indoor environment is removed by the refrigerant vapor flowing in the inside coil 104. The low pressure vapor is next directed to the inlet 101 of the compressor 102 where it is compressed back into the high pressure, high temperature vapor.

To operate the system in heating mode, in which heat energy generated by the compressor 102 is transferred to the inside environment, the reversing valve assembly 110 is manipulated so that refrigerant flows essentially in reverse through the system. Specifically, as illustrated in FIG. 2, high temperature, pressurized vapor from the discharge 103 of the compressor 102 is first directed by the reversing valve assembly 110 to the inside coil 104. At the inside coil 104, the pressurized refrigerant vapor condenses into liquid refrigerant through an exothermic reaction in which heat energy is removed from the refrigerant and transferred to the inside environment. The pressurized liquid refrigerant is next directed to the outside coil 106. At the outside coil 106, in the second stage of the heating cycle, the liquid refrigerant expands through an expansion device into a low pressure vapor phase through an endothermic reaction. The low pressure vapor is next directed to the inlet 101 of the compressor 102 via the reversing valve assembly 110 where it is again compressed back into the high temperature, high pressure vapor.

Accordingly, as will be appreciated, the flow of heat energy in the heat pump system 100 is governed by the direction of refrigerant flow, which is regulated by the selective manipulation of the reversing valve assembly 110. Reversing valve assemblies of various styles and configurations have been developed to accomplish the regulation of refrigerant flow. In addition to the various styles, reversing valve assemblies are available in a wide range of sizes and through-put to accommodate the wide range of heat pump system sizes as well as for other applications.

Referring to FIG. 3, there is illustrated a reversing valve assembly 110 constructed in accordance with the teachings of the invention. The reversing valve assembly 110 includes a hollow valve body 112 and an actuator 114. Referring to FIGS. 3 and 4, the valve body 112 has a generally cylindrical-shaped sidewall 120 extending between a first end 122 and a parallel, opposing second end 124. Defined within the valve body 120 between the ends 122, 124 and the cylindrical sidewall 126 is an internal chamber 126. The first and second ends 122, 124 are accordingly spaced apart from each other by the length of the cylindrical sidewall 120. Moreover, the cylindrical sidewall 120 extends along and defines a longitudinal axis line 128 that, in the illustrated embodiment, is normal to the first and second ends 122, 124. The valve body 112, including its cylindrical sidewall 120 and its first and second ends 122, 124, are preferably joined together to hermetically seal the interior chamber 126 and can be made from any suitable material, such as steel or aluminum.

To interconnect the reversing valve assembly 110 to the heat pump system, a plurality of flow tubes, including a first, second, third, and fourth tubes 130, 132, 134, 136 are provided. Specifically, the first flow tube 130 is in communication with the discharge 103 of the compressor and therefore receives high pressure, high temperature refrigerant. The second flow tube 132 communicates with the inlet 101 of the compressor 102 and therefore directs low pressure, low temperature refrigerant returning from the system. The third and fourth tubes 134, 136, also known as system tubes, communicate with the inside and outside heat exchangers 104, 106. The flow tubes can be connected to the rest of the refrigeration system by brazing or bonding. The flow tubes communicate with the hollow valve body 112 through respective first, second, third, and fourth ports 140, 142, 144, 146. The flow tubes can be made from any suitable material such as metal or plastic and preferably are hermetically joined to the ports by, for example, welding or adhesive bonding. In the illustrated embodiment, the flow tubes are cylindrical and the ports are accordingly circular.

In accordance with an aspect of the invention, to reduce the pressure drop across the reversing valve assembly 110, the flow tubes 130, 132, 134, 136 and their respective ports 140, 142, 144, 146 are arranged so that refrigerant is channeled in a more or less straight line across the hollow valve body 112. To accomplish this, in the embodiment illustrated in FIG. 3, the first and second ports 140, 142 are disposed through the first end 122 while the third and fourth ports 144, 146 are disposed through the opposing second end 124. Moreover, the first, second, third, and fourth flow tubes 130, 132, 134, 136 are all arranged generally parallel to each other and to the axis line 128. Due to the manner in which the flow tubes are connected to the heat pump system, all refrigerant flow between the second, compressor inlet tube 132 and the third and fourth system tubes 134, 136 occurs generally within the axial direction between the first and second ends 122, 124 of the valve body 112. Moreover, all flow between the first, compressor discharge tube 130 and the third and fourth system tubes 134, 136 likewise occurs generally axially between the first and second ends 122, 124. Accordingly, reversing refrigerant flow in the system does not require redirecting the refrigerant through a sharp bend.

Referring to FIG. 4A, to channel the refrigerant between the second, compressor inlet port 142 and the third and fourth system ports 144, 146, the reversing valve assembly 110 includes a movable valve member 150 situated in the interior chamber 126. The valve member 150 includes an elongated valve tube 152 that surrounds and defines a channel 156 and extends between the first and second ends 122, 124. To access the channel 156, the opposing ends of the valve tube 152 are formed as a first flange 160 having a first opening 164 and a second flange 162 having a second opening 166. The channel 156 is disposed through the valve tube 152 in a generally straight line between the first and second openings 164, 166. The first flange 160 is coupled to the first end 122 such that the first opening 164 and the channel 156 intersect the second port 142. The second flange 162 is proximate to the second end 124 and is selectively movable so that the second opening 166 and the channel 156 can intersect either of the third and fourth ports 144, 146, as illustrated in FIGS. 5 and 6.

Figure 5:
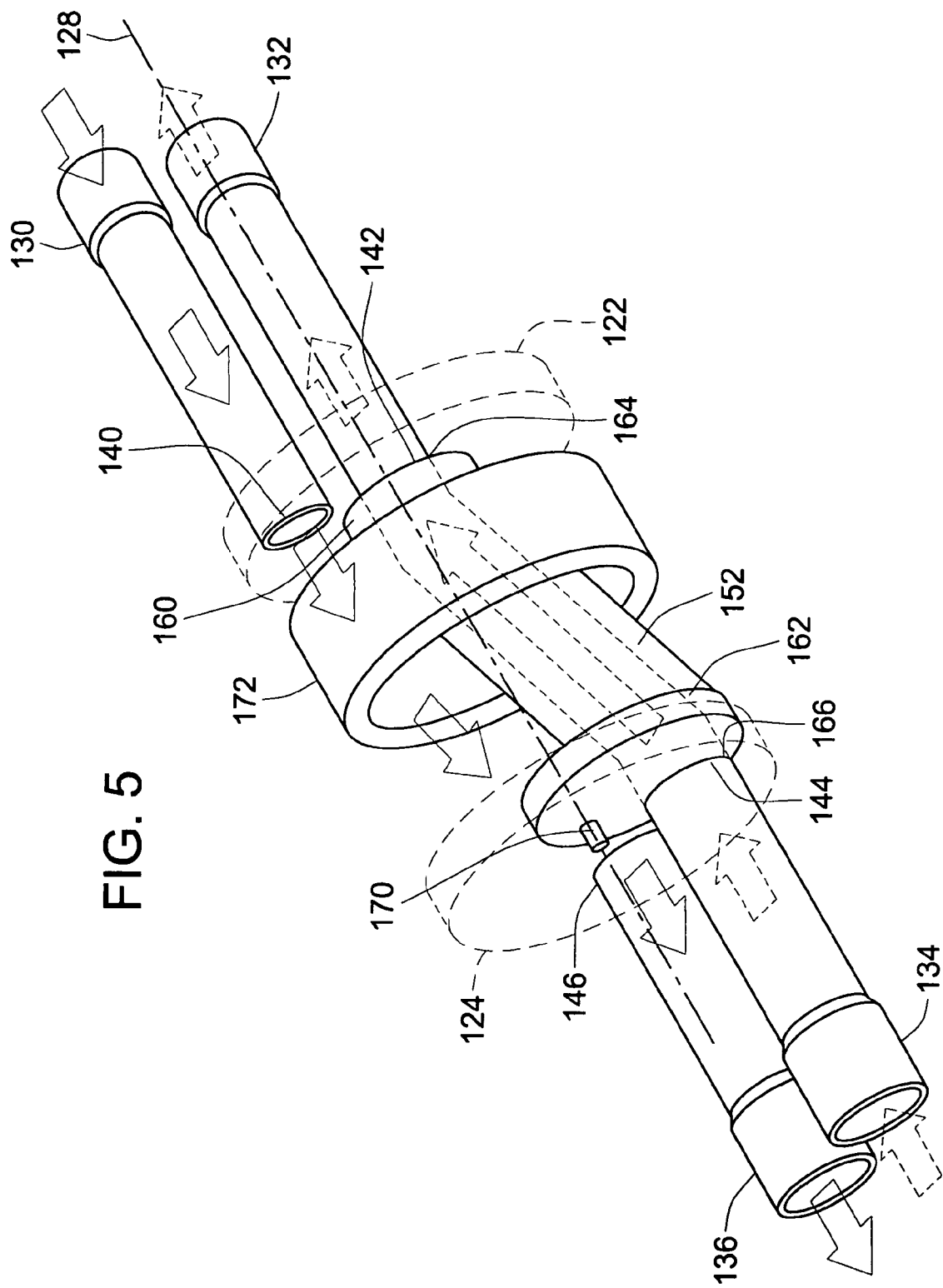
FIG. 5 is a top perspective view of the reversing valve assembly with the valve body removed illustrating the valve member in a first position and with arrows illustrating the flow of refrigerant.
Figure 6:
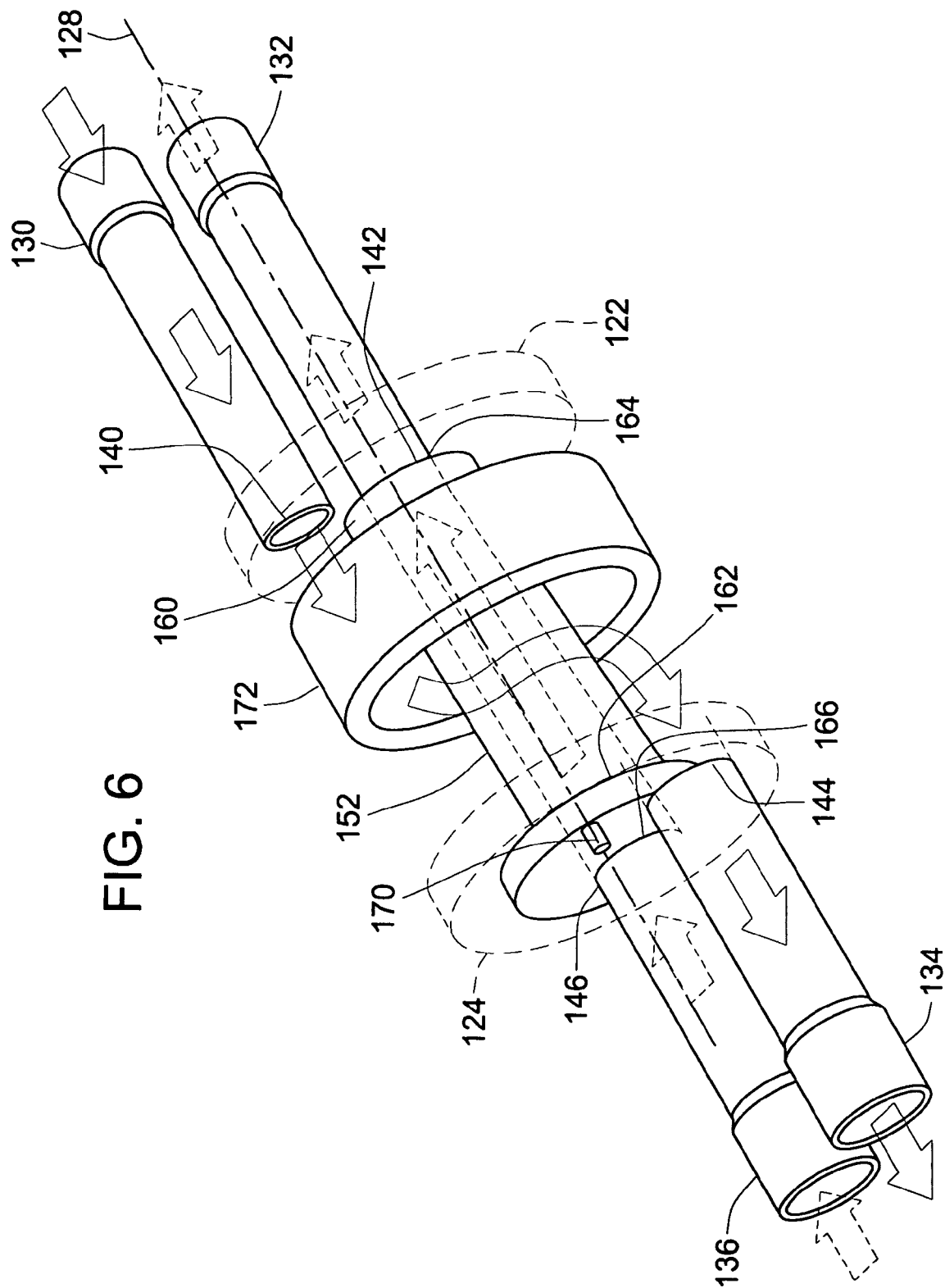
FIG. 6 is a top perspective view of the reversing valve assembly with the valve body removed illustrating the valve member in a second position and with arrows illustrating the flow of refrigerant.

Accordingly, the valve member 150 can be moved to a first position establishing communication between the second and third flow tubes 132, 134, as shown in FIG. 5, and a second position establishing communication between the second and fourth tubes 132, 136, as shown in FIG. 6. Moreover, referring to FIG. 4A, refrigerant flow between the first compressor discharge port 140 and the third and fourth system ports 144, 146 occurs across the interior chamber 126 and is separated from the refrigerant flow to the second compressor inlet port 142 by the valve member 150. The valve tube 152 can be made from any suitable material and in any suitable shape, but is preferably constructed rigidly enough to resist collapsing due to the pressure differential existing between high pressure refrigerant in the interior chamber 126 and low pressure refrigerant in the channel 156 without requiring additional structural support. Accordingly, the need for support structures that obstruct flow in some prior art reversing valves is eliminated by the valve tube 152. A thick-walled, cylindrical shape for the valve tube 152 is most preferable.

To accommodate the various ports in a manner that enables the reversing valve assembly 110 to switch between heating and cooling modes, as illustrated in FIG. 4A, the second, compressor inlet port 142 is axially aligned with the axis line 128. The third and fourth system ports 144, 146, however, are radially offset from the axis line 128 and therefore are located between the axis line and the sidewall 120. Moreover, the third and fourth ports 144, 146 are angularly offset from each other with respect to the axis line 128, preferably at a small enough angle that the third and fourth ports are located generally nearby each other.

Because the second port 142 is coaxial to the axis line 128 while the third and fourth ports 144, 146 are radially offset from the axis line, the valve tube 152 must extend between the first and second ends 122, 124 at an angled relationship with respect to the axis line. Accordingly, as will be appreciated, refrigerant flow between the second, compressor inlet tube 132 and the third and fourth flow tubes 134, 136 cannot occur in a perfectly straight line. However, the path of refrigerant flow is still generally within the axial direction and occurs via a relatively straight channel between the first and second ends 122, 124. The relatively straight channeling of refrigerant results in far less disruption to the refrigerant flow, as opposed to redirecting the refrigerant flow through a sharp bend, and therefore reduces the pressure drop across the reversing valve assembly. Furthermore, the angled relationship between the valve tube 152 and the axis line 128 is a function of the length of the cylindrical sidewall 120 and can be minimized by sufficiently elongating the sidewall. Preferably, the angled relationship is about 30 degrees or less.

Figure 4B:
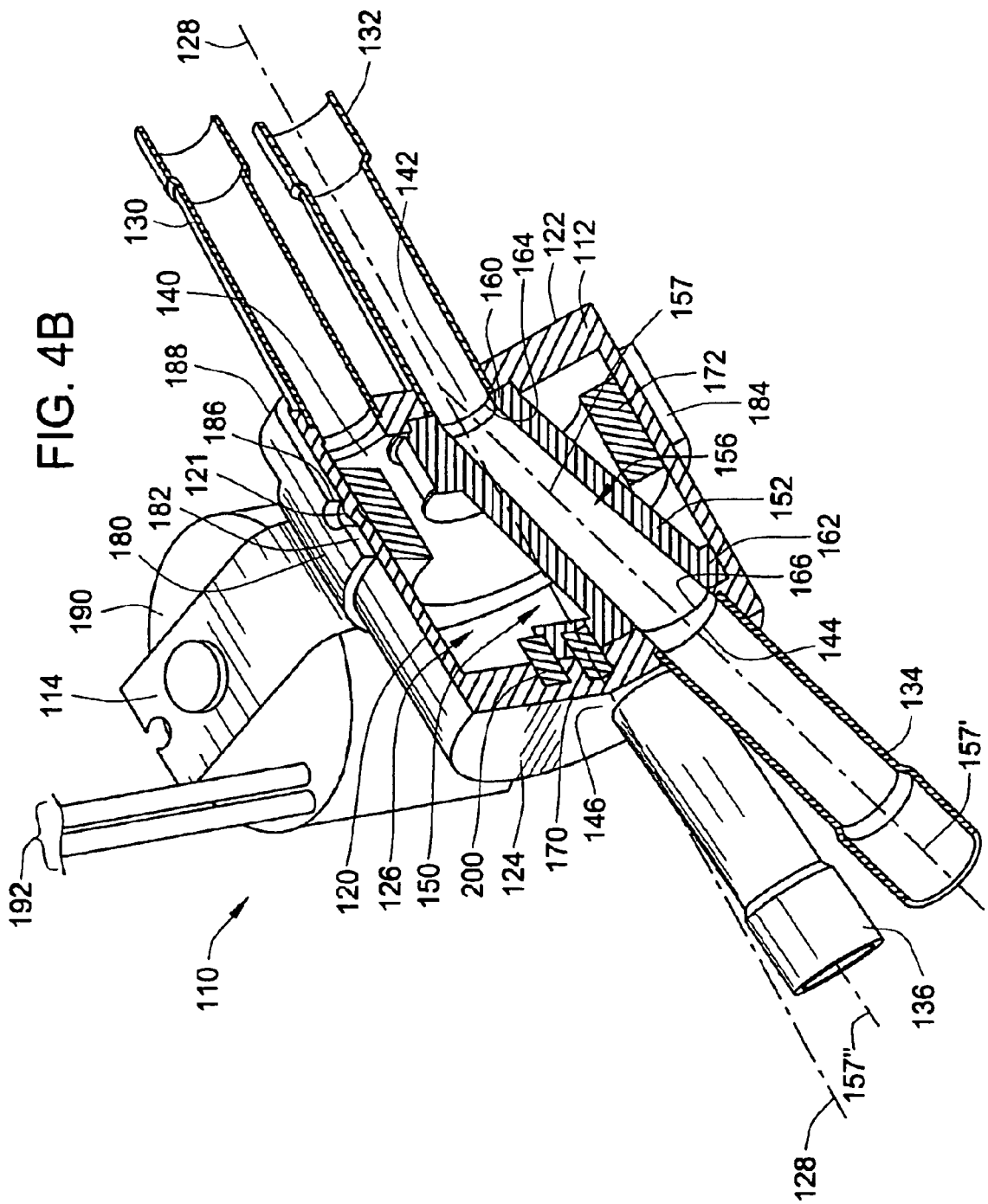
FIG. 4B is a cutaway view, taken generally along lines 4A-4A in FIG. 7, of an alternate embodiment of a reversing valve assembly, according to the invention, which is generally similar in all respects to the reversing valve embodiment of FIG. 4A, except that the axes of the valve outlet tubes extend along an axis defined by a flow channel of the movable, generally straight valve member for selectively redirecting refrigerant between selected ports.

As shown in FIG. 4B, in embodiments of the invention where it is desired to further reduce disruption of the path of refrigerant flow through the valve, the third and fourth tubes 134, 136 may be attached to the second end 124 of the valve body 120 at an angle, rather than being oriented parallel to the axis line 128, in such a manner that their respective axes 157', 157" extend coincidentally with an axis 157 of the flow channel 156 in the valve member 150, when the valve member 150 is positioned to align the flow channel 156 with the third and fourth tubes 134, 136 respectively. With this arrangement, the path of the refrigerant flow is not redirected even slightly, within the reversing valve 110, at the second end 124 of the valve body 112.

To enable moving the valve member 150 between the first and second positions, as illustrated in FIGS. 5 and 6, the valve member pivotally engages the first and second ends 122, 124. Specifically, referring to FIG. 4A, the first flange 160 is journalled or rotatably coupled to the first end 122 proximate to the second port 142. Accordingly, the first opening 164 and second port 142 are always aligned. Additionally, the coupling between the first flange 160 and first end 122 functions as a first pivot point that is concentric to the axis line 128. Preferably, the coupling between the first flange 160 and first end 122 includes a face seal or similar element to prevent refrigerant from leaking between the channel 156 and the interior chamber 126.

The second flange 162 is adjacent to and slidable against the second end 124. To align the second opening 166 with the third and fourth ports 144, 146, referring to FIGS. 4A, 7, and 8, the second flange 162 is generally shaped as a cam with the second opening 166 disposed through the wider main portion 168. The lobe portion 169 of the cam-shaped second flange 162 is aligned with the axis line 128 and is pivotally connected to the second end 124. The pivotal connection can be accomplished with a pivot pin 170 that is disposed into and journalled with respect to the second flange 162 and the second end 124 proximate to the axis line 128. The offset between the pivot pin 170 and the second opening 166 corresponds to the radial offset between the axis line 128 and the third and fourth ports 144, 146. Preferably, to prevent refrigerant from leaking between the channel and the interior chamber, a gasket or seal is located between the second flange and second end.

Figure 7:
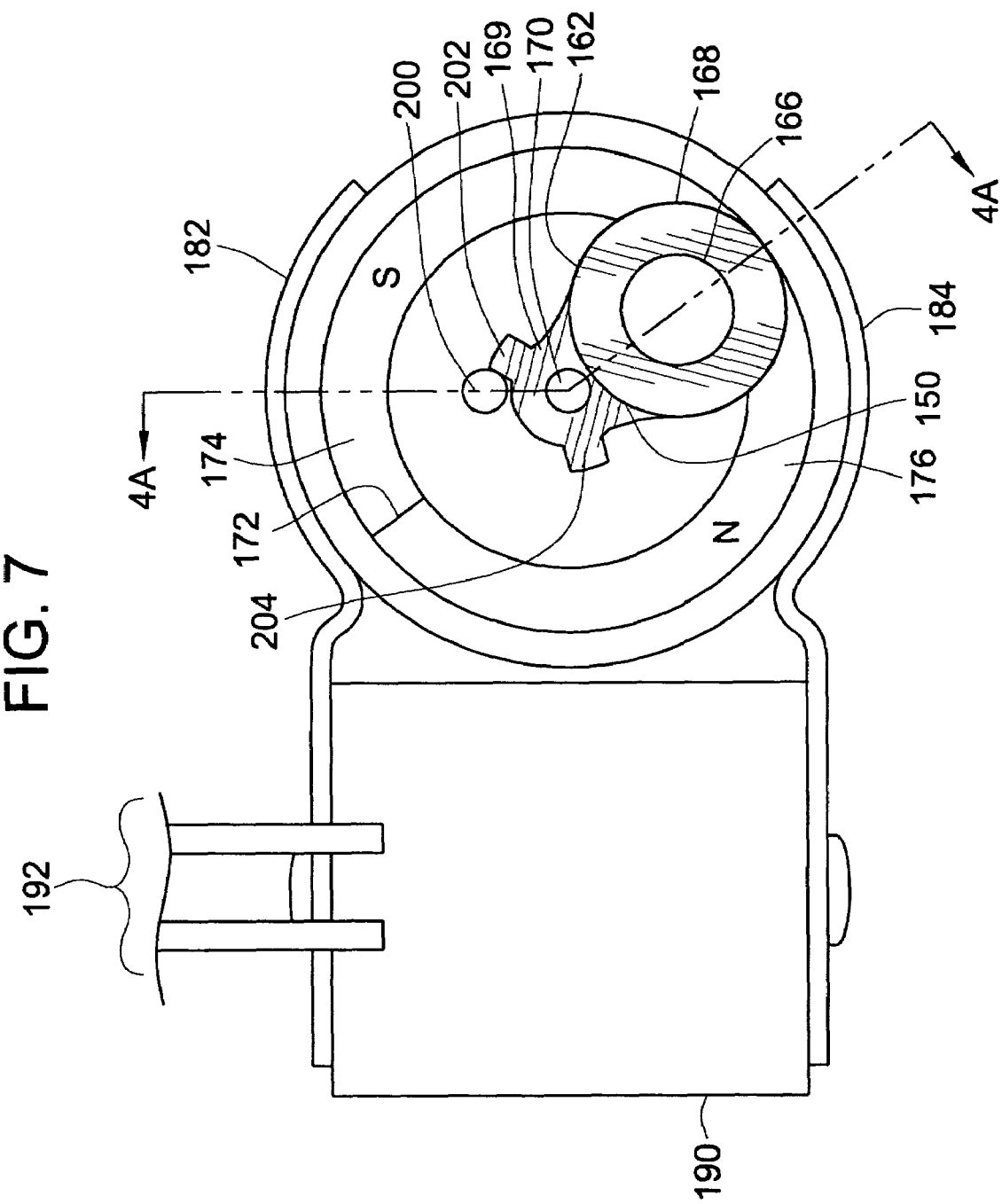
FIG. 7 is a front elevational view of an embodiment of the reversing valve assembly with the valve body removed illustrating the valve member moved to the first position by a magnetic actuator.
Figure 8:
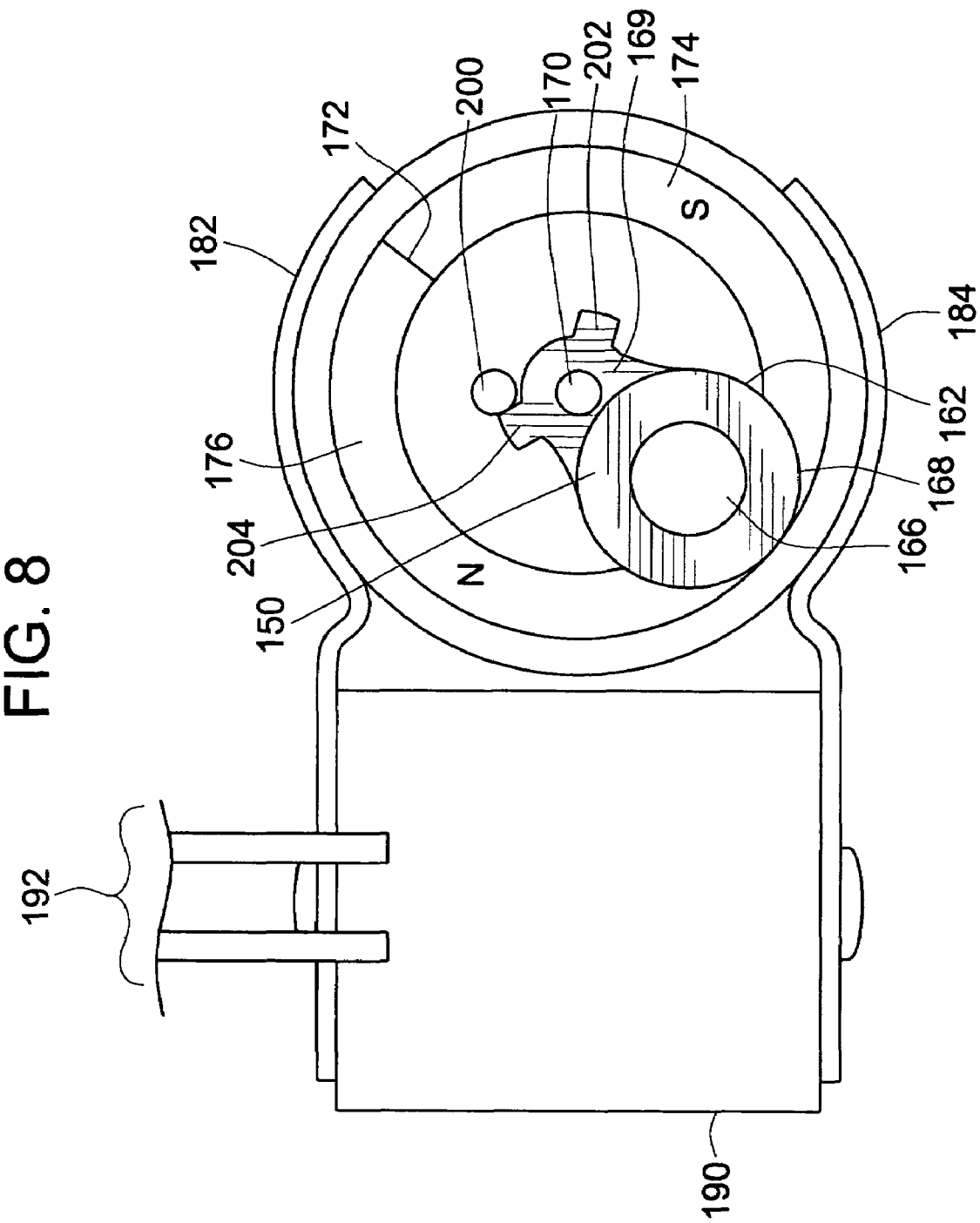
FIG. 8 is a front elevational view of the reversing valve assembly of FIG. 8 with the valve body removed illustrating the valve member moved to the second position by the magnetic actuator.

Referring to FIG. 4A, movement of the valve member 150 is accomplished by partly rotating the valve member within the cylindrical sidewall 120. Specifically, because the first flange 160 is journalled to the first end 122, rotation of the valve member 150 results in concentric movement between the first opening 164 and both the axis line 128 and second port 142. Referring to FIGS. 7 and 8, because the cam-shaped second flange 162 is pivoted through the lobe portion 169 via pivot pin 170, rotation of the valve member 150 results in eccentric movement of the second opening 166 with respect to the axis line 128. As will be appreciated from FIGS. 5 & 6, the eccentric motion of the second opening 166 allows the channel to alternatively intersect the nearby third and fourth ports 144, 146. Accordingly, the axis line 128, along which the pivot pin 170 and first opening 164 are aligned, is also the axis of partial rotation of the valve member 150.

Another advantage of channeling refrigerant flow between opposing ends is improved leakage control. Specifically, because flow is channeled generally straight and unimpeded between the second inlet port 142 and the opposing third and fourth system ports 144, 146, the momentum of flowing refrigerant does not significantly attempt to misalign the valve member 150. Moreover, because of the co-extensive alignment between the openings 164, 166 and the ports 142, 144, 146, refrigerant does not significantly attempt to leak between the flanges 160, 162 and the ends 122, 124. Furthermore, because of the sliding contact between the flanges 160, 162 and the ends 122, 124, common sealing solutions readily apparent to those of skill in the art can be employed to further reduce leaking.

To move the valve member between the first and second positions, as illustrated in FIG. 3, the actuator 114 is included as part of the reversing valve assembly 110. The actuator can operate in any number of various ways. For example, in the embodiment illustrated in FIGS. 3 and 4, the actuator 114 is a magnetic actuator that utilizes the principles of magnetism to partly rotate the valve member 150. The magnetic actuator includes a permanent magnet 172 located in the interior chamber 126 and fixedly joined to the valve member 150 and an electromagnet 180 attached to the valve body 112. Preferably, in the present embodiment, the valve body and valve member are made of a material that is permeable to the magnetic flux between the permanent magnet and the electromagnet but are not themselves magnetic. An advantage of using a permeating magnetic flux to move the valve member is that that valve body can be hermetically sealed to prevent leakage of refrigerant and provide sufficient strength to the reversing valve assembly. Additionally, the complicated sealing and piping arrangements common with pilot valves is eliminated and the reversing valve does not rely upon system pressure to move between positions.

The permanent magnet 172 is generally annular in shape and corresponds in diameter to the inner surface of the cylindrical sidewall 120. Moreover, the annular permanent magnet is coaxial to the axis line 128 and able to rotate with respect to the axis line and the cylindrical sidewall 120. In an embodiment, to accurately locate in the interior chamber 126 the permanent magnet 172 and the valve member 150 to which it is joined, the permanent magnet can be received in a channel formed into the interior surface of the cylindrical sidewall 120. Preferably, the annular permanent magnet 172 is joined to the valve member 150 in such a manner as to permit substantially unobstructed flow across the interior chamber 126 between the first, compressor discharge port 140 and the system ports 144, 146. For example, referring to FIG. 4A, the valve tube 152 can have a diameter less than the inner diameter of the annular permanent magnet 172 so that, as the valve member 150 passes through the annular permanent magnet, substantial space is provided for refrigerant to flow between the valve member and permanent magnet. Referring to FIGS. 7 and 8, as will be familiar to those of skill in the art, the permanent magnet 172 has a south pole that corresponds to a first semi-annular half 174 and a north pole that corresponds to an opposing, second semi-annular half 176.

Referring to FIGS. 4A, 7, and 8, the electromagnet 180 includes a first leg 182 and a second leg 184 that can be made from any suitable material for generating an electromagnetic flux. The valve body 112 is received between the first and second legs 182, 184 such that the legs extend about opposing sides of the cylindrical sidewall 120. Accordingly, the valve body 112, including the permanent magnet 172 inside and the axis line 128, are located between the first and second legs 182, 184. As illustrated in FIG. 4A, the first leg 182 can include an aperture 186 that receives a raised boss 121 formed on the exterior of the cylindrical sidewall 120 to form a snap-fit attachment. The snap-fit attachment eliminates the need for additional fasteners. In an embodiment, to axially position the electromagnet 180 with respect to the permanent magnet 172, the first leg 182 can include a tab 188 that extends longitudinally over the exterior of the cylindrical sidewall 120 and adjacently to the first end 122 in order to locate off of the first flow tube 130. To supply power to the electromagnet 180, the actuator 114 also includes a coil 190 with wire leads 192 that is connected to the first and second legs 182, 184.

In operation, to move the valve member 150 into the first position as illustrated in FIG. 7, a voltage is supplied to the coil 190 which in turn applies a first polarity to the electromagnet 180. More specifically, the first polarity configures the first leg 182 as a magnetic north pole and the second leg 184 as a magnetic south pole. When so configured, the first leg 182 attracts the magnetic south semi-annular half 174 of the permanent magnet while the second leg 184 attracts the magnetic north semi-annular half 176. As illustrated in FIGS. 5 and 7, the magnetic attraction causes the permanent magnet 172 and the valve member 150 to pivot to the first position wherein the second opening 166 aligns with the third port 144. To move the valve member into the second position, as illustrated in FIG. 8, a different voltage is supplied to the coil 190 that applies a second polarity configuring the first leg 182 as a magnetic south pole and the second leg 184 as a magnetic north pole. Accordingly, the first leg 182 now attracts the magnetic north semi-annular half 176 of the permanent magnet 172 while the second leg 184 attracts the magnetic south semi-annular half 174. As illustrated in FIGS. 6 and 8, this causes the valve member 150 to rotate so that the second opening 166 now aligns with the fourth port 146.

Referring to FIG. 4A, to accurately align the second opening 166 with the third and fourth system ports 144, 146 and prevent over-rotation of the permanent magnet 172, a stop pin 200 can be pressed into the second end 124 that constrains the movement of the valve member 150. The stop pin 200 extends into the interior chamber 126 and is located above and parallel to the axis line 128. For the stop pin 200 to engage the valve member 150 as illustrated in FIGS. 7 and 8, the second flange 162 includes a first shoulder 202 and an opposing second shoulder 204, both of which are formed on and project from the lobed portion 169. The shoulders 202, 204 project in a radial direction with respect to the axis line 128 and are angularly spaced-apart from each other with respect to the axis line. Received between the first and second shoulders 202, 204 is the stop pin 200. When the valve member 150 is pivoted to the first position, as illustrated in FIG. 7, the stop pin 200 abuts against the first shoulder 202 preventing further movement of the valve member and thereby further rotation of the permanent magnet. When the valve member 150 is pivoted to the second position, as illustrated in FIG. 8, the stop pin 200 abuts against the second shoulder 204 preventing further movement of the valve member and thereby further rotation of the permanent magnet.

Of course, alternative actuators can be used with the straight flow reversing valve assembly to move the valve member. These alternative actuators include manual actuators that operate via the use of levers or cables, electromechanical actuators that operate via the use of motors and gear drives, pneumatic or hydraulic actuators that may utilize pressure from the refrigeration system, or other electromagnetic actuators such as rotary solenoids. In any event, the aforementioned invention is not limited to a particular style of actuator.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A reversing valve comprising:
    a valve body having a first end and an opposing second end, the first end including first and second ports disposed therein, and the second end including third and fourth ports disposed therein;
    an elongated valve member defining a channel and extending between the first end and the second end, the valve member movable within the valve body between a first position wherein the channel intersects the second and third ports while simultaneously allowing communication between the first and fourth ports, and a second position wherein the channel intersects the second and fourth ports while simultaneously allowing communication between the first and third ports;
    wherein the valve body is generally cylindrical in shape and defines a longitudinal axis line, and the second port is coaxial with the axis line;
    wherein the third and fourth ports are radially offset from the axis line, and are angularly offset from each other with respect to the axis line; and
    wherein the valve member includes an elongated valve tube extending between a first flange and a second flange, the channel disposed within the valve tube, the channel accessed through the first flange by a first opening and accessed through the second flange by a second opening.

2. The reversing valve of claim 1, wherein the first flange is journalled to the first end such that the first opening is aligned to the second port and the axis line, and wherein the second flange is pivotally connected to the second end proximate the axis line such that the second opening is radially offset from the axis line.

3. The reversing valve of claim 2, wherein, when the valve member moves between the first and second positions, the first opening rotates concentrically with respect to the second port and the second opening pivots eccentrically between intersecting the third and fourth ports.

4. A reversing valve comprising:
    a valve body having a first end and an opposing second end, the first end including first and second ports disposed therein, and the second end including third and fourth ports disposed therein; and
    an elongated valve member defining a channel and extending between the first end and the second end, the valve member movable within the valve body between a first position wherein the channel intersects the second and third ports while simultaneously allowing communication between the first and fourth ports, and a second position wherein the channel intersects the second and fourth ports while simultaneously allowing communication between the first and third ports;

wherein the valve body is generally cylindrical in shape and defines a longitudinal axis line, and the second port is coaxial with the axis line; and wherein the channel is generally straight and extends between the first and second ends at an angled relationship with respect to the axis line, the angled relationship being about 30 degrees or less.

5. A reversing valve comprising:

a valve body having a first end and an opposing second end, the first end including first and second ports disposed therein, and the second end including third and fourth ports disposed therein; and an elongated valve member defining a channel and extending between the first end and the second end, the valve member movable within the valve body between a first position wherein the channel intersects the second and third ports while simultaneously allowing communication between the first and fourth ports, and a second position wherein the channel intersects the second and fourth ports while simultaneously allowing communication between the first and third ports;

wherein the valve body is generally cylindrical in shape and defines a longitudinal axis line, and the second port is coaxial with the axis line; and further comprising an actuator for moving the valve member; and wherein the actuator includes a generally annular permanent magnet joined to the valve member and coaxial to the axis line, and an electromagnet extending generally around the valve body.

6. The reversing valve of claim 5, wherein the valve member passes through the annular permanent magnet.

7. The reversing valve of claim 5, wherein the permanent magnet has a north pole corresponding to a first semi-annular half and a south pole corresponding to a second semi-annular half, and the electromagnet includes a first leg and a second leg, the valve body located between the first and second legs, whereby an applied first polarity causes the first leg to attract the north pole and an applied second polarity causes the first leg to attract the south pole.

8. A reversing valve comprising:

a valve body having a first end and an opposing second end, the first end including first and second ports disposed therein, and the second end including third and fourth ports disposed therein;

an elongated valve member defining a channel and extending between the first end and the second end, the valve member movable within the valve body between a first position wherein the channel intersects the second and third ports while simultaneously allowing communication between the first and fourth ports, and a second position wherein the channel intersects the second and fourth ports while simultaneously allowing communication between the first and third ports;

wherein the valve body is generally cylindrical in shape and defines a longitudinal axis line, and the second port is coaxial with the axis line; and wherein the valve member includes a pair of opposing, spaced-apart shoulders, and the valve body includes a stop pin extending into the interior chamber between the shoulders such that, when the valve member is moved to the first position, the stop pin abuts the first shoulder and, when the valve member is moved to the second position, the stop pin abuts the second shoulder.

9. A reversing valve comprising:

a valve body having a first end and an opposing second end, the first end including first and second ports disposed therein, and the second end including third and fourth ports disposed therein;

an elongated valve member defining a channel and extending between the first end and the second end, the valve member movable within the valve body between a first position wherein the channel intersects the second and third ports while simultaneously allowing communication between the first and fourth ports, and a second position wherein the channel intersects the second and fourth ports while simultaneously allowing communication between the first and third ports;

wherein the valve body is generally cylindrical in shape and defines a longitudinal axis line, and the second port is coaxial with the axis line; and further comprising a first flow tube, a second flow tube, a third flow tube, and a fourth flow tube, the first, second, third, and fourth flow tubes joined to the respective first, second, third and fourth ports, the first, second, third, and fourth flow tubes being generally parallel to each other and to the axis line.

10. A reversing valve comprising:

a valve body having a first end and an opposing second end, the first end including first and second ports disposed therein, and the second end including third and fourth ports disposed therein;

an elongated valve member defining a channel and extending between the first end and the second end, the valve member movable within the valve body between a first position wherein the channel intersects the second and third ports while simultaneously allowing communication between the first and fourth ports, and a second position wherein the channel intersects the second and fourth ports while simultaneously allowing communication between the first and third ports;

wherein the valve body is generally cylindrical in shape and defines a longitudinal axis line, and the second port is coaxial with the axis line; and wherein the elongated valve member further defines an axis of the channel extending between the first end and the second end, the axis of the channel extending at an angle relative to the longitudinal axis line, and the reversing valve further comprises a first flow tube, a second flow tube, a third flow tube, and a fourth flow tube, the first, second, third, and fourth flow tubes joined to the respective first, second, third and fourth ports, with the first and second flow tubes extending generally parallel to each other and to the axis line, the third flow tube oriented with respect to the longitudinal axis line to extend generally parallel to the axis of the channel when the valve member is disposed in the first position, and the fourth flow tube being oriented with respect to the longitudinal axis line to extend generally parallel to the axis of the channel when the valve member is disposed in the second position.

11. A reversing valve comprising:

a valve body defining an internal chamber, the valve body including a first port and a second port disposed through a first end and a third port and a fourth disposed through a second opposed end;

a movable valve member defining a channel for establishing fluid communication between a selectable pair of the second, third and fourth ports;

an actuator for moving the valve member, the actuator including a permanent magnet joined to the valve member and an electromagnet;

whereby, when a first polarity is applied to the electromagnet, the valve member moves to a first position wherein the channel intersects the second and third ports establishing fluid communication between the second and third ports while simultaneously allowing fluid communication between the first and fourth ports via the internal chamber; and whereby, when a second polarity is applied to the electromagnet, the valve member moves to a second position wherein the channel intersects the second and fourth ports establishing fluid communication between the second and fourth ports while simultaneously allowing fluid communication between the first and third ports via the internal chamber;

wherein the permanent magnet is located in the internal chamber and the electromagnet extends at least partly around the valve body;

wherein the valve body is generally cylindrical with a first end and an opposing second end, the cylindrical valve body defining a longitudinal axis line, and the permanent magnet is generally annular in shape and is aligned coaxially to the axis line;

wherein the electromagnet includes a first leg and a second leg, the cylindrical valve body positioned between the first and second legs; and wherein the annular permanent magnet includes a north pole corresponding to a first semi-annular half and a south pole corresponding to a second semi-annular half, whereby, when the first polarity is applied the first leg attracts the north pole and repels the south pole, and when the second polarity is applied, the first leg attracts the south pole and repels the north pole.

* * * * *